Patented Aug. 14, 1951

2,564,610

UNITED STATES PATENT OFFICE 2,564,610

PROCESS FOR PREPARING RYANODINE

Edward F. Rogers, Middletown, N. J., assignor to Merck & Co., Inc., Rahway, N. J., a corporation of New Jersey No Drawing. Application February 19, 1949, Serial No. 77,444

6 Claims. (Cl. 260—236)

This application is a continuation-in-part of my pending application Serial No. 774,895, filed September 18, 1947.

This invention relates to chemical compounds having insecticidal activity, and more particularly to the new insecticidal alkaloid, ryanodine, and to the process for preparing the same in pure crystalline form.

In United States Patent No. 2,400,295, issued may 14, 1946, to Folkers, Rogers and Heal, my colleagues and I have disclosed procedures for obtaining from leaves, stems and roots of plants of the genus Ryania, by extraction, an alkaloidal fraction having marked insecticidal activity. The procedures there disclosed, however, lead only to extracts or concentrates in solvent media, or dry amorphous powders, which comprise alkaloidal mixtures. Not all of the alkaloidal material in these mixtures is active as an insecticide, and since the composition of these mixtures varies depending on the plant material employed and extraction procedure used, it is difficult to obtain extracts or concentrates of uniform composition and potency.

I have discovered an improved extraction procedure by which it is possible for the first time to obtain an insecticidally active alkaloid, ryanodine, in pure, crystalline form from woody stem and root materials of plants of the genus Ryania. Ryanodine can be obtained from various Ryania species, but the preferred source is *Ryania speciosa* Vahl since this species is most extensively available.

Regarded in certain of its broader aspects the novel process in accordance with the present invention comprises preparing from Ryania plant materials by extraction procedures, an insecticidally active residue essentially free of impurities which are a. Water and organic solvent-soluble,
b. Water-insoluble and organic solvent-soluble, or
c. Water-soluble and organic solvent-insoluble, dissolving the residue in a solvent of the class consisting of acetone and ether and crystallizing out crude ryanodine, and purifying the crude material by recrystallization from ether.

In removing impurities as above-mentioned, two general procedures can be employed. When an aqueous solution of Ryania extractives is extracted with ether, the ether exhibits the unusual ability to extract the active principle while rejecting most of the water and organic solvent-soluble impurities, and the ether extract thus obtained forms, upon concentration to dryness, a residue which can be treated as above-described to obtain pure ryanodine. Chloroform, on the other hand, has the unusual ability to retain the water and organic solvent-soluble impurities while giving up the active principle to water. Thus when a chloroform-water separation of Ryania extractives is effected, either by extracting the plant material with water and extracting the aqueous extract with chloroform, or by extracting the plant material with chloroform and extracting the chloroform extract with water, and the resulting aqueous solution is extracted with an organic solvent of the class consisting of ether and amyl acetate, followed by concentration of the organic solvent extract to dryness, a residue is obtained which can be treated as above-described to obtain pure ryanodine.

Pure ryanodine thus obtained, forms clear, colorless crystals melting consistently at 219–220° C., and has a specific rotation of $+26°$ (c. 1.02 in methanol). It is a neutral substance, soluble in water, alcohol, acetone, ether and chloroform, difficultly soluble in benzene, and insoluble in petroleum ether. The ultraviolet absorption spectrum shows a maximum at 2685Å.

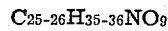

in alcohol solution.

The molecular weight of ryanodine determined by the Rast method is about 487. Microanalytical data are in agreement with the formulas $$C_{25-26}H_{35-36}NO_9$$

having molecular weights of 493 and 508. Functional group analysis indicate that ryanodine contains six or seven active hydrogen atoms, a minimum of three carbon-methyl groups, and no acetyl, methoxy, or nitrogen-methyl groups.

Ryanodine is many times more active insecticidally than Ryania extracts prepared as described in said United States Patent No. 2,400,295. In view of the high potency which is consistently obtained in pure ryanodine, it will be evident that ryanodine is a valuable substance for use in the compounding of insecticidal sprays and dusts. It will also be noted that since ryanodine is a colorless substance, it is particularly suited for inclusion in mothproofing preparations for white and light colored fabrics.

The preparation of ryanodine in accordance with the present invention is carried out by extracting stem and root material of Ryania plants with water or with an organic solvent such as chloroform or methanol. When an organic solvent is used, better extraction is obtained with wet wood than with dry wood. In practice, extraction with water or chloroform is favored since these solvents introduce least complication in succeeding steps of the process.

When water is used for extraction the plant material is preferably extracted twice with boiling water, approximately one gallon of water per pound of plant material, for three-hour periods. After separation of the plant material, the combined aqueous extract is concentrated to about 1/30 the original volume in vacuo and clarified by centrifuging. The resulting concentrate is exhaustively extracted with ether, or alternatively is treated with chloroform to remove impurities and then extracted with ether or with amyl acetate, and the organic solvent extract is concentrated to dryness in vacuo. The light brown fluffy solid thus obtained is dissolved in ether or acetone, the solution is concentrated to about 1/3 to 1/2 volume and allowed to stand to separate crystalline ryanodine. Cooling to about 0-5° C. after crystallization begins fosters complete crystallization. The crude material obtained on initial crystallization melts at about 142-150° C., and this is refined to obtain pure ryanodine, melting at 219-220° C. by five or six recrystallizations from ether.

When chloroform is used for extraction a quantity of Ryania plant materials, preferably ground to approximately 20-mesh, is thoroughly wetted with water, and placed in a Soxhlet type extraction apparatus, and extracted with chloroform for about 24 hours. The chloroform extract is concentrated to about 1/4 volume and then extracted with several quantities of water totalling about twice the volume of the chloroform extract. The combined water extracts are then extracted with ether or amyl acetate and worked up as described above.

It should be noted that following either of the water-chloroform separations of Ryania extractives it is preferable to extract the resulting aqueous solution with amyl acetate because of the very favorable distribution coefficient of ryanodine, i. e. about 7.5, in an amyl acetate-water system.

The following are typical examples of satisfactory procedures for the preparation of ryanodine, but it is to be understood that these examples are are given by way of illustration and not of limitation.

Example I

One kilogram of root of *Ryania speciosa* Vahl., ground to approximately 20-mesh, was extracted twice by stirring with 8-liter volumes of boiling water for three-hour periods. The plant material was removed after the extractions by means of a basket centrifuge. The combined extracts were concentrated in vacuo to a volume of 500 ml. The concentrate was clarified by centrifuging and then extracted continuously with ether for sixteen hours. The filtered ether extract was concentrated to dryness in vacuo, final traces of water being removed by an oil pump. The residue, a light brown, fluffy solid, weighed 4.1 g. It was redissolved in 250 ml. of ether by refluxing for a short time. The ether solution was concentrated to 100 ml.-volume, then allowed to stand at room temperature until crystallization began (one to two days). The solution was then placed in an icebox to complete the crystallization. (Premature chilling caused precipitation of amorphous material which hindered crystallization.) The yield of crude material which melted at 142-150° was 1.150 g. By six recrystallizations of the crude material from ether, 180 mg. of pure ryanodine which melted constantly at 219-220° was obtained: $a_D^{25}$ 26° (c. 1.02 in methyl alcohol). All samples were dried to constant weight at 100° in vacuo before analysis.

Anal. Calcd. for $C_{25}H_{35}NO_9$: C, 60.83; H, 7.15; N, 2.84; M. W. 493.5; 7 active H, 1.43; 3(C)—$CH_3$, 9.14. Calcd. for $C_{26}H_{37}NO_9$: C, 61.52; H, 7.35; N, 2.76; M. W. 507.57. Found C, 61.01, 60.89, 60.78, 61.29, 61.37, 61.22, 61.26 (average 61.14); H, 7.29, 7.41, 7.51, 7.45, 7.26, 7.00, 7.10 (average 7.29); N, 2.74, 2.83, 2.82, 2.79, 2.94 (average 2.82); M. W. (Rast), 486.6; active H (hot); 1.21, 1.44, 1.42, 1.18 (average 1.31); (C)—$CH_3$, 9.10. Methoxy, N-methyl and acetyl determinations were negative.

Example II

Five hundred grams of stem of *Ryania speciosa* Vahl. ground to approximately 20-mesh, was thoroughly wetted by admixture with 800 ml. of water. The wet wood was placed in a Soxhlet apparatus and extracted with chloroform for twenty-four hours. The chloroform extract was concentrated to a volume of 750 ml., then extracted with four 300-ml. volumes of water. The combined aqueous extracts were extracted with four 200-ml. volumes of amyl acetate. The amyl acetate extract was concentrated to dryness in vacuo, giving 1.925 g. of a light brown powder. Crystallization of this material from concentrated acetone solution yielded 0.893 g. of crude alkaloid melting at 155-160°. Pure ryanodine was obtained in 16% yield after five recrystallizations from ether.

Example III

One kilogram of *Ryania speciosa* stem wood, ground to approximately 20-mesh, was extracted by stirring in 8 l. of boiling water for seventeen hours. The extract was filtered and concentrated to 800 ml. volume. The cooled concentrate was extracted twice with 400 ml. volumes of chloroform, then thrice with 400 ml. volumes of amyl acetate. The chloroform extract was discarded. The combined amyl acetate extracts were concentrated to dryness in vacuo, giving 1.716 g. of product. This was dissolved in 30 ml. of boiling ether, and the filtered solution was stored at room temperature. In two weeks, 358 mg. of crude crystalline product melting at 140-50° C. was secured. After several recrystallizations from ether, approximately 100 mg. of pure ryanodine melting at 218-20° C. was secured.

The following examples are given to show the comparative insecticidal and mothproofing properties of ryanodine and Ryania extracts of the type disclosed in said U. S. Patent No. 2,400,295.

Example IV

Adults of the German cockroach, *Blatella germanica*, were anaesthetized with carbon dioxide, and small measured quantities of solutions of ryanodine and of total aqueous Ryania extractives or principles were deposited on their ventral thoracic surfaces. The dosages of insecticide were varied by adjusting the concentration of the solutions. Dosage-mortality curves were established for ryanodine and for crude aqueous extractives of *Ryania speciosa* stem by this method using a test of four days' duration.

The L. D. 50 established by this test for these materials follows:

Ryanodine—
    Female—approx. 3.5 mg./kg. of body weight
    Male—approx. 1.75 mg./kg. of body weight Ryania aqueous extractives 7R3344—
  Female—approx. 250 mg. extvs./kg. of body wt.
  Male—approx. 125 mg. extvs./kg. of body wt.

The results of this test show ryanodine to be approximately 70 times as potent as the aqueous extractives.

*Example V*

Samples of woolen fabric were impregnated with aqueous solutions of the crude aqueous extractives of *Ryania speciosa* stem and with alcoholic solutions of ryanodine to give varying concentrations of the materials on the fabric. The treated fabrics were then permitted to dry. These samples of the treated fabrics were subjected to the feeding attack of larvae of the webbing clothes moth, *Tineola biselliella*, for two weeks. Following this period of attack the losses in weight of the fabrics were determined. From these data concentration-damage curves were plotted and the concentration of each Ryania material permitting the marginal feeding damage of 8 mg. (from the feeding of 10 larvae for two weeks, the larvae being 25±1 day old at the start of the test) was established.

The marginal protective concentrations thus established are given below.

Ryanodine—0.001% by weight of wool
Ryania aqueous extractives—0.056% of weight of wool Various changes and modifications can be made in the procedures herein described without departing from the spirit and scope of the present invention, and I am to be limited only by the appended claims.

I claim:

1. The process that comprises extracting Ryania plant material with a solvent selected from the group consisting of water and chloroform, extracting the resulting extract with a solvent selected from the group consisting of water and chloroform, and different from the solvent initially employed, extracting the resulting aqueous solution with an organic solvent selected from the group consisting of ether and amyl acetate, concentrating the organic solvent extract to dryness in vacuo forming an amorphous residue, dissolving the residue in a solvent selected from the group consisting of acetone and ether and crystallizing out crude ryanodine.

2. The process that comprises extracting Ryania plant material with a solvent selected from the group consisting of water and chloroform, concentrating the extract thus obtained and extracting the resulting concentrate with a solvent selected from the group consisting of water and chloroform, and different from the solvent initially employed, said last named extraction, when water is employed as the solvent, involving extraction of a chloroform concentrate with quantities of water totalling about twice the volume of the chloroform concentrate, and when chloroform is employed as the solvent, involving extraction of a water extract with about an equivalent volume of chloroform, extracting the resulting aqueous solution with an organic solvent selected from the group consisting of ether and amyl acetate, concentrating the organic solvent extract to dryness in vacuo forming an amorphous residue, dissolving the residue in a solvent selected from the group consisting of acetone and ether and crystallizing out crude ryanodine.

3. The process that comprises extracting Ryania plant material with a solvent selected from the group consisting of water and chloroform, concentrating the extract thus obtained and extracting the resulting concentrate with a solvent selected from the group consisting of water and chloroform, and different from the solvent initially employed, said last named extraction, when water is employed as the solvent, involving extraction of a chloroform concentrate with quantities of water totalling about twice the volume of the chloroform concentrate, and when chloroform is employed as the solvent, involving extraction of a water extract with about an equivalent volume of chloroform, extracting the resulting aqueous solution with amyl acetate, concentrating the amyl acetate extract to dryness in vacuo forming an amorphous residue, dissolving the residue in a solvent selected from the group consisting of acetone and ether and crystallizing out crude ryanodine.

4. The process that comprises exhaustively extracting moist Ryania plant material with chloroform for about 24 hours, concentrating the chloroform extract to about ¼ volume and then extracting with several quantities of water totalling about twice the volume of the chloroform concentrate, extracting the combined aqueous extracts with amyl acetate, evaporating the amyl acetate extract to dryness in vacuo forming an amorphous residue, dissolving the residue in a solvent of the class consisting of acetone and ether and crystallizing out crude ryanodine, and purifying the crude ryanodine by recrystallization from ether.

5. The process that comprises exhaustively extracting moist ground stems and roots of *Ryania speciosa* Vahl. with chloroform for about 24 hours, concentrating the chloroform extract to about ¼ volume and then extracting with several quantities of water totalling about twice the volume of the chloroform concentrate, extracting the combined aqueous extracts with amyl acetate, evaporating the amyl acetate extract to dryness in vacuo forming an amorphous residue in a solvent of the class consisting of acetone and ether and crystallizing out crude ryanodine, and purifying the crude ryanodine by recrystallization from ether.

6. The process that comprises exhaustively extracting Ryania plant material from boiling water for about 17 hours, concentrating the aqueous extract to about $\frac{1}{10}$ volume, extracting the aqueous concentrate with about an equivalent volume of chloroform, and then with about one and one-half volumes of amyl acetate, concentrating the amyl acetate extract to dryness in vacuo forming an amorphous residue, dissolving the residue in a solvent of the class consisting of acetone and ether and crystallizing out crude ryanodine, and purifying the crude ryanodine by recrystallization from ether.

EDWARD F. ROGERS.

REFERENCES CITED

The following references are of record in the file of this patent:

UNITED STATES PATENTS

| Number | Name | Date |
|---|---|---|
| 2,400,295 | Folkers et al. | May 14, 1946 |